Oct. 30, 1934. E. H. G. ARNOLD 1,978,877
BERRY PICKER'S SACK
Filed Aug. 1, 1933
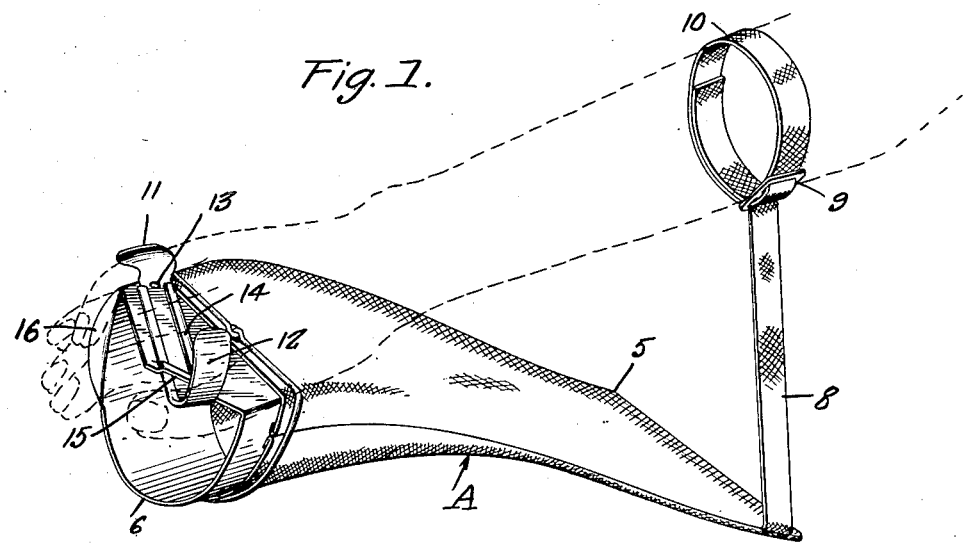
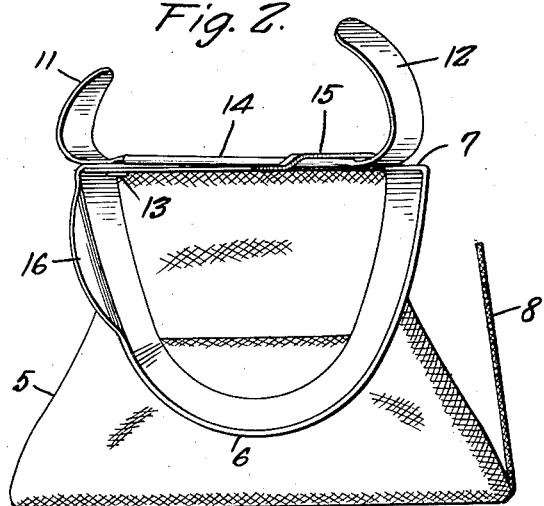
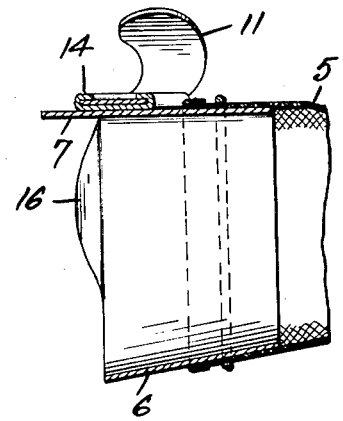
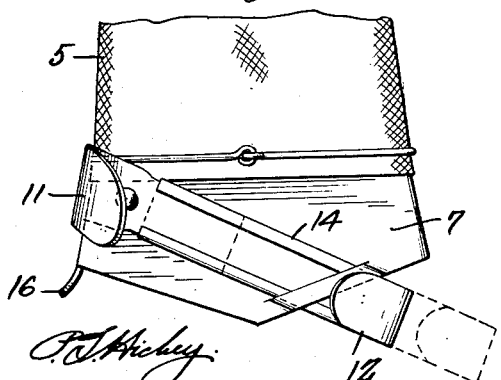
Eugene H. G. Arnold,
INVENTOR Patented Oct. 30, 1934

1,978,877

UNITED STATES PATENT OFFICE 1,978,877

BERRY PICKER'S SACK

Eugene H. G. Arnold, Shillington, Pa.

Application August 1, 1933, Serial No. 683,200

1 Claim. (Cl. 150—2)

The invention relates to a fruit gathering sack and more especially to a berry picker's sack.

The primary object of the invention is the provision of a sack of this character, wherein the mouth end thereof carries a mouth piece provided with an adjustable clamp or handhold so that when the sack is carried by a fruit or berry picker the said sack can be conveniently engaged with the hand used for the picking of fruit or berries, whereby the released fruit can be gathered within the sack in a convenient manner and on the filling thereof its contents can be readily discharged into baskets or other containers for the fruit.

Another object of the invention is the provision of a sack of this character, wherein the same, when carried by a user, can be strapped to the arm of that hand of the user used in the picking or gathering of fruit or berries and said hand will be free for use in the picking of the fruit or berries, the sack being of novel construction and avoiding loss of picked fruit falling from the gathering hand of the user of the sack, and in the mounting of the latter the same is in convenient position with respect to the gathering hand so that fruit or berries can be picked and gathered with dispatch irrespective of the point of location thereof prior to the picking of the same.

A further object of the invention is the provision of a sack of this character, wherein the clamp for the mounting of the sack upon the hand of a user thereof is readily adjustable to accommodate different sizes of hands and will assure the proper positioning of the mouth of the sack with relation to the hand when picking fruit or berries to permit the gathering of the fruit or berries without any loss during the picking operation.

A still further object of the invention is the provision of a sack of this character, which is extremely simple in construction, thoroughly reliable and efficient in its purpose, readily and easily mounted upon and removed from the arm and hand of a user, enabling the picking of fruit or berries with dispatch, strong, durable, readily and easily handled, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a perspective view of the sack constructed in accordance with the invention and shown applied to the arm and hand of a user thereof, the arm and hand being shown by dotted lines.

Figure 2 is an enlarged end elevation.

Figure 3 is a fragmentary longitudinal sectional view through the same.

Figure 4 is a fragmentary top plan view.

Similar reference characters indicate corresponding parts throughout the several views in the drawing.

Referring to the drawing in detail, A designates generally a sack which is of elongated formation closed as at 5 at one end and open at the opposite end. This open end of the sack A is fitted with a mouth piece 6 having a flattened upper portion 7, the mouth piece being preferably flared outwardly to increase the size of the entrance end thereof. Through the mouth piece 6 is adapted to be introduced fruit, such as cherries or berries, when being picked.

At the closed end 5 of the sack A is a strap 8 carrying a buckle 9 to permit the adjustable looping, as at 10, of the end portion of the strap to have such looped end embrace the forearm of a user of the sack, with the closed end 5 suspended beneath the forearm, as is clearly shown in Figure 1 of the drawing.

Arranged at the flat upper portion 7 of the mouth piece 6 are the stationary and adjustable jaws 11 and 12, respectively, of a hand clamp, the jaw 11 being riveted at 13 to said upper portion 7 of the mouth piece, while the jaw 12 is provided with opposite side flanges 14 for slidably connecting said jaw 12 to the jaw 11, these jaws being adapted to embrace the hand of a user inwardly with respect to the finger knuckles and underlying the palm of the hand. The upper portion 7 of the mouth piece 6 is cut and bent to form a guide loop 15 for the jaw 12 which is slidably fitted with the jaw 11, the loop 15 being diagonally disposed so as to set the jaws 11 and 12 in diagonally opposed relation to each other. The jaws 11 and 12 are upwardly and inwardly bent to conform to the contour of the hand of the user and when engaged with the latter will support the mouth piece suspended from the palm of the hand and the fingers of such hand will be free for manipulation for the picking of fruit or berries, and these when picked will drop into the sack A for the gathering thereof. The mouth piece at one side thereof is formed with a little finger rest or lip 16 against which is placed the little finger of the hand of the user when the sack is carried by said hand and thus the mouth piece 6 of the sack 5 can be controlled to properly position the same with respect to the fruit or berries at the moment of picking thereof.

What is claimed is:

A berry picker's sack comprising a mouth piece having a flat outwardly tapered top portion presenting angular edges thereto, a loop cut and bent from the top portion and following one of its angular edges, a sack having an open end removably secured to the mouth piece, an arm engaging suspension strap connected with the sack remote from its open end, and adjustable and stationary jaws forming a hand clamp fitted with the loop, the stationary jaw being fixed to the flat upper portion to dispose the hand clamp in a following position with respect to the other angular edge of said top portion.

EUGENE H. G. ARNOLD.